United States Patent [19]

Alden

[11] 4,121,226
[45] Oct. 17, 1978

[54] IDLER GUIDE FOR FACSIMILE SCANNING BELT

[75] Inventor: John M. Alden, Needham, Mass.

[73] Assignee: Alden Research Foundation, Westboro, Mass.

[21] Appl. No.: 781,114

[22] Filed: Mar. 25, 1977

[51] Int. Cl.² ............................................. G01D 15/24
[52] U.S. Cl. ................................ 346/139 A; 74/242.8; 74/242.14 R
[58] Field of Search ........................ 346/139 A, 139 B; 74/242.8, 242.9, 242.11 C, 242.11 S, 242.11 A, 242.14 R, 242.1 A

[56] References Cited

U.S. PATENT DOCUMENTS

| | | | |
|---|---|---|---|
| 2,963,918 | 12/1960 | Blakstad | 74/242.8 |
| 3,028,693 | 4/1962 | Malzahn | 74/242.14 X |
| 3,348,230 | 10/1967 | Ross | 346/139 A X |
| 3,369,250 | 2/1968 | Gifft | 346/139 A X |

Primary Examiner—Joseph W. Hartary
Attorney, Agent, or Firm—Grover and Meegan

[57] ABSTRACT

Facsimile apparatus which graphically records electric signals on recording paper drawn through a recording zone has a linear recording electrode on one side of the zone and a cooperative scanning belt carrying one or more recording styli. The styli are orbited on the other side of the recording zone by a drive sprocket wheel engaging the belt. At the other end of the recording zone the belt passes over an idler guide which has integral flanges at each end of its semicylindrical body receiving the belt. The guide also has a plunger portion sliding against a spring in a socket on the recorder frame, the spring causing the guide means to tauten the belt.

9 Claims, 5 Drawing Figures

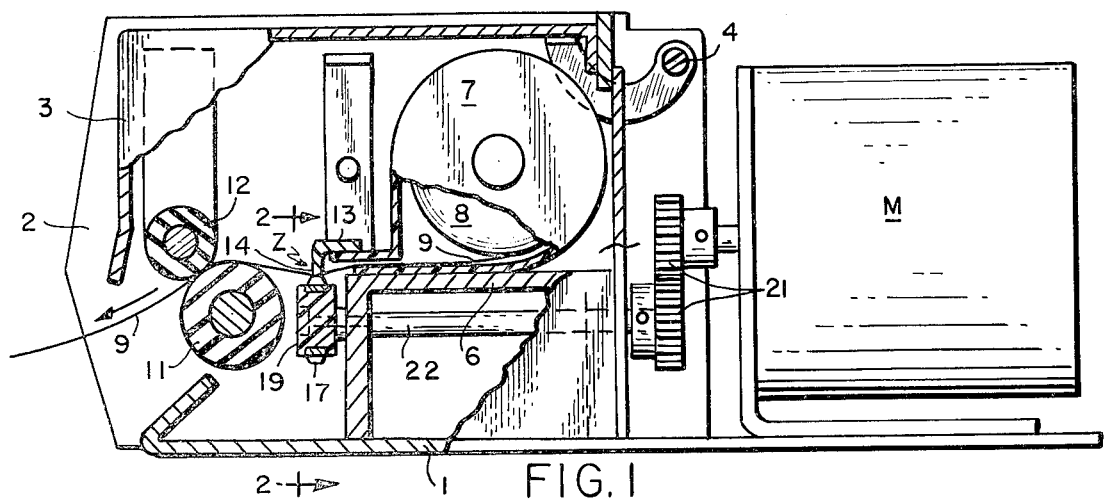
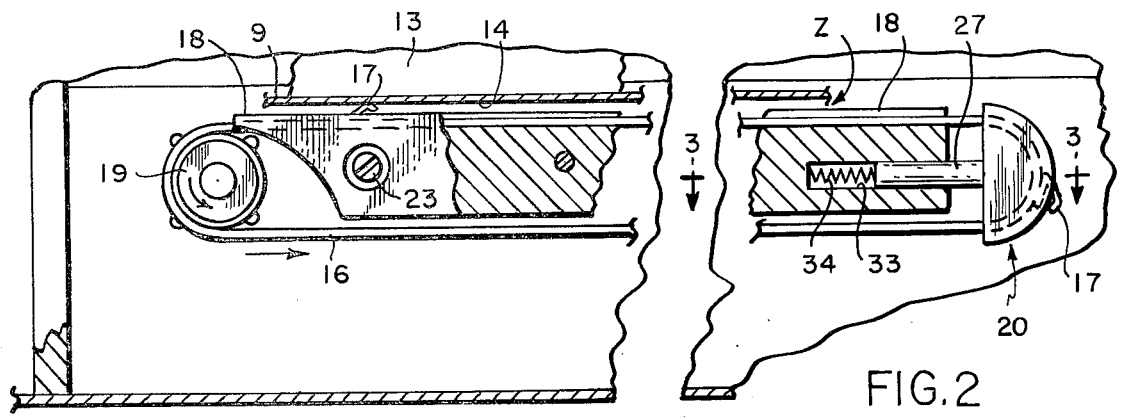
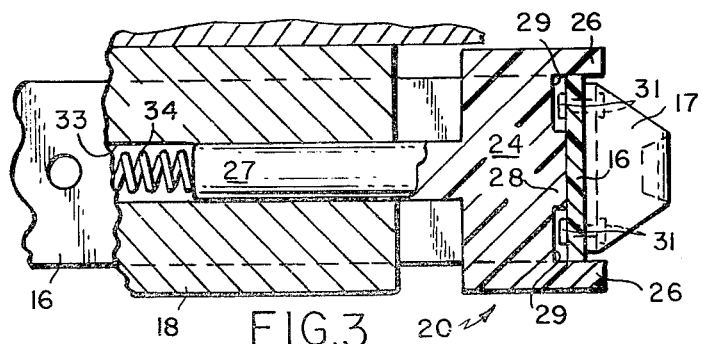
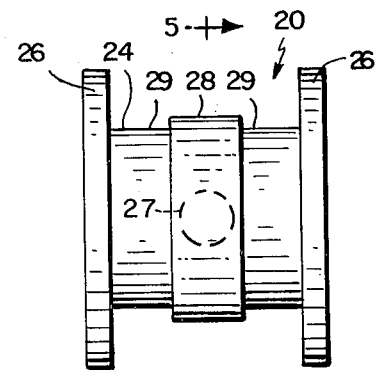
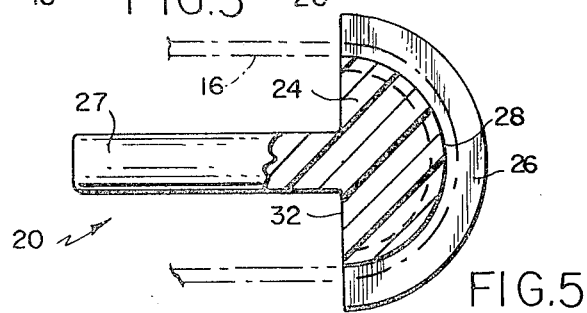

IDLER GUIDE FOR FACSIMILE SCANNING BELT

BACKGROUND OF THE INVENTION

This invention relates to facsimile recorders of the type wherein one or more styli carried on a belt traverse a web of recording paper opposite a linear electrode. Electrical signals applied to a stylus and the linear electrode are marked on the recording web as described fully in copending application Ser. No. 755,211, filed Dec. 29, 1976, now U.S. Pat. No. 4,060,815 incorporated herein by reference.

The recorder as described in that application drives the belt on a drive sprocket wheel and an idler roll, both of which are fixed on the recorder frame. However, the recorder of the application would benefit by provision for easier mounting and more constant tension on the belt. A straight forward manner of meeting the two requirements would be by providing a spring loaded, movable idler pulley in place of the fixed idler pulley of the aforementioned application. Such a movable idler pulley belt guide would, however, increase the cost of the recorder by requiring at least a roll with a bearing and some kind of yoke for the bearing as well as a rocker arm for the whole assembly. The movable support for the idler roll would also at least partially obstruct access to the roll to mount the belt, and the drag of the marking stylus produces a slack only behind the stylus which would not be taken up by an idler roll.

It is therefore an object of the invention to provide a more economical form of belt guide, which is easier to manufacture and far simpler to instal in a recorder, which does not obstruct mounting of the belt and which affords uniform tautness around the belt.

STATEMENT OF INVENTION

According to the invention a guide means for a stylus-supporting scanning belt orbiting through a recording zone on the frame of a graphic signal recorder, the guide means comprises a cylindrical body of low friction, molded material therewith for receiving the scanning belt thereon, and a plunger portion integral with the cylindrical body and extending radially therefrom, the plunger being adapted to be slidingly supported on the recorder frame.

DRAWING

FIG. 1 is a side elevation, partly broken away of a facsimile recorder with a scanning belt and guide means according to the invention;

FIG. 2 is a section on line 2—2 of FIG. 1;

FIG. 3 is an enlarged section on line 3—3 of FIG. 2 showing the guide means enlarged;

FIG. 4 is an end view of the guide means on the scale of FIG. 3; and

FIG. 5 is a section on line 5—5 of FIG. 4.

DESCRIPTION

As shown in FIGS. 1 and 2 a facsimile recorder having a base 1 with side walls 2 between which a cover 3 is hinged at a pivot 4. A platform frame 6 on the base 1 supports a cassette 7 holding a roll 8 of electrolytic paper recording web whose leading end 9 is drawn by suitably driven feed rolls 11 and 12 on the base and cover respectively. The cassette 7 mounts a linear electrode 13 of L-shaped cross section, the shorter leg of the L providing a straight recording edge 14 bearing on the paper 9 along a recording zone Z transverse of the paper. Below the web is a scanning assembly shown most clearly in FIG. 2 and consisting of a belt 16 carrying spring styli 17. The belt travels in an orbit along a track 18 below the linear electrode 14 and recording zone Z, and over a sprocket wheel 19 and a guide means 20 according to the present invention. The sprocket wheel is driven by a motor M through a gear chain 21 and shaft 22. The track 18 is attached to the platform b of the frame base 1 by fasteners 23 of which one is shown. As the belt carries each stylus 17 along the recording zone Z at the top of the track 18 electric facsimile signals applied to the linear electrode and the stylus mark the paper 9.

The guide means 20 of the present invention, as shown particularly in FIGS. 3 to 5, consists of a semicylindrical body 24 having flanges 26 at each end. As shown in FIG. 3 these flanges receive and guide the scanning belt 16. The guide means 20 is molded of plastic material, preferably a low surface friction plastic such as Nylon or Teflon polymer so that the flanges 26 and a plunger portin 27 are molded integrally with the cylindrical surface. The cylindrical surface has a land 28 between two annular recesses 29. The land 28 supports the belt while the recesses 29 receive eyelets 31 while secure the stylus 17 to the belt.

The plunger portion 27 extends at a right angle to the exposed diameter 32 of the cylindrical guide body 20, and as shown in FIGS. 2 and 3 is slidingly received in a socket 33 in the track 18 of the platform frame 6. The socket confines a compression spring 34 which yieldingly opposes the plunger and urges it in a direction from the drive sprocket wheel 19 so as to tauten the belt.

Whereas a conventional idler roll would require several individually machined or formed parts requiring further assembly and difficulty in mounting the belt, the present belt guide is a simply molded one piece part, of utter simplicity to install, and affording unobstructed access to the mounting of the belt thereon.

It should be understood that the present disclosure is for the purpose of illustration only and that this invention includes all modifications and equivalents which fall within the scope of the appended claims.

I claim:

1. Guide means for a stylus-supporting scanning belt orbiting through a recording zone on the frame of a graphic signal recorder, the guide means comprising:
   a cylindrical body of low friction, molded material, and
   a plunger portion integral with the cylindrical body and extending radially therefrom, the plunger being adapted to be slidingly supported on the recorder frame.

2. Guide means according to claim 1 wherein the material is a polymeric plastic.

3. Guide means according to claim 1 including flanges at each end of the body integral therewith for receiving the scanning belt therebetween.

4. Guide means according to claim 1 wherein the cylindrical body has a land between two annular recesses, the land supporting the belt and the recesses receiving means fastening the stylus to the belt.

5. Guide means according to claim 1 wherein the body is semicylindrical and the plunger portion extends at a right angle to the diameter of the semicylinder.

6. A graphic recorder of electrical signals comprising:
   a frame defining a recording zone, a belt carrying a record marking stylus, means to drive the belt and orbit the stylus through the recording zone, and guide means including a cylindrical body of low friction, molded material having an integral plunger portion extending radially from the cylindrical body, and means on the frame yieldingly receiving the plunger portion and urging the belt away from the drive means and tauten the belt.

7. A graphic recorder according to claim 6 wherein the frame has a socket receiving the plunger portion and a compression spring in the socket.

8. Guide means according to claim 6 wherein the body is semicylindrical and the plunger portion extends at a right angle to the diameter of the semicylinder.

9. A graphic recorder of electrical signals comprising:

feed means drawing a recording web through a recording zone, a linear recording electrode on one side of the zone, cooperative scanning electrode means traversing the other side of the zone, the scanning means including a belt with a scanning stylus electrode thereon, drive means at one end of the recording zone engaging the belt to orbit the stylus through the zone repeatedly, guide means for the belt at the other end of the recording zone comprising a cylindrical body with lateral flanges receiving the belt therebetween, and having a unitary plunger portion extending radially of the cylindrical body toward the drive means, and frame means supporting the drive and guide means including a socket with resilient means yieldingly receiving the plunger portion and urging the cylindrical body in a direction to tauten the belt.

* * * * *